United States Patent
Gilmore

Patent Number: 5,806,827
Date of Patent: Sep. 15, 1998

[54] ROTATABLE FISHING ROD HOLDER ASSEMBLY FOR A CART

[76] Inventor: Jerry Lee Gilmore, 11230 Sproule Ave., Pacoima, Calif. 91331

[21] Appl. No.: 673,497

[22] Filed: Jul. 1, 1996

[51] Int. Cl.$^6$ .............................. A01K 97/10; A45B 25/28
[52] U.S. Cl. .......................... 248/534; 248/538; 43/21.2
[58] Field of Search ................... 248/534, 538, 248/520; 43/21.2; D34/12, 18, 21, 24, 25, 26

[56] References Cited

U.S. PATENT DOCUMENTS

| | | | |
|---|---|---|---|
| D. 286,699 | 11/1986 | Thomas, Jr. | D34/26 |
| D. 306,396 | 3/1990 | Brushaber | 248/538 X |
| D. 323,413 | 1/1992 | Miller | D34/26 |
| D. 357,783 | 4/1995 | Jones | D34/24 X |
| D. 378,456 | 3/1997 | Speicher | D34/25 |
| 4,017,050 | 4/1977 | Rosenau | 248/534 |
| 4,819,903 | 4/1989 | Jiminez | 248/538 |
| 4,901,970 | 2/1990 | Moss et al. | 248/534 X |
| 5,068,996 | 12/1991 | Shank | 248/538 X |
| 5,159,777 | 11/1992 | Gonzalez | 43/54.1 |
| 5,209,009 | 5/1993 | Fast | 43/21.2 X |
| 5,333,885 | 8/1994 | Pullman | D34/25 X |
| 5,377,944 | 1/1995 | Getsinger | 248/538 X |
| 5,511,336 | 4/1996 | Bishop | 43/21.2 |
| 5,561,937 | 10/1996 | Johnson | 248/534 X |
| 5,588,630 | 12/1996 | Chen-Chao | 248/520 X |

*Primary Examiner*—Daniel P. Stodola
*Assistant Examiner*—Emmanuel M. Marcelo

[57] ABSTRACT

A fishing rod holder assembly adapted for use in association with a cart and a fishing rod, the apparatus comprising: a base board formed in a planar configuration with a centrally positioned hole extending therethrough, the base board including coupling devices extending therefrom; and a fishing rod support tube formed in an elongated cylindrical configuration with an open end, a closed end and an essentially hollow interior, the tube including a centrally positioned radially extending hole, in an operative orientation a bolt being positioned through the hole in the tube and circular hole in the base board, a wing nut being coupled around the bolt, in an operative orientation a user coupling the base board to a cart and adjusting the angle of the tube by first loosening and then tightening the wing nut, the user then positioning a fishing rod within the tube.

2 Claims, 3 Drawing Sheets

ROTATABLE FISHING ROD HOLDER ASSEMBLY FOR A CART

BACKGROUND OF THE INVENTION

1. Field of the Invention

The present invention relates to a fishing rod holder assembly and more particularly pertains to supporting a fishing rod in a desired position with a fishing rod holder assembly.

2. Description of the Prior Art

The use of fishing accessory carriers is known in the prior art. More specifically, fishing accessory carriers heretofore devised and utilized for the purpose of storing and transporting fishing accessories are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,333,885 to Pullman discloses a fishing cart apparatus.

U.S. Pat. No. 5,159,777 to Gonzales discloses a fishing cart apparatus.

U.S. Pat. No. Des. 323,413 discloses a fishing equipment carrying cart.

U.S. Pat. No. Des. 319,907 to Fountain discloses a fisherman's cart.

U.S. Pat. No. Des. 286,699 to Thomas, Jr. discloses a fisherman's cart, or similar article.

U.S. Pat. No. 3,997,181 to Jaco et al. discloses a fisherman's cart.

While these devices fulfill their respective, particular objective and requirements, the aforementioned patents do not describe a fishing rod holder assembly for supporting a fishing rod in a desired position.

In this respect, the fishing rod holder assembly according to the present invention substantially departs from the conventional concepts and designs of the prior art, and in doing so provides an apparatus primarily developed for the purpose of supporting a fishing rod in a desired position.

Therefore, it can be appreciated that there exists a continuing need for new and improved fishing rod holder assembly which can be used for supporting a fishing rod in a desired position. In this regard, the present invention substantially fulfills this need.

SUMMARY OF THE INVENTION

In the view of the foregoing disadvantages inherent in the known types of fishing accessory carriers now present in the prior art, the present invention provides an improved fishing rod holder assembly. As such, the general purpose of the present invention, which will be described subsequently in greater detail, is to provide a new and improved fishing rod holder assembly and method which has all the advantages of the prior art and none of the disadvantages.

To attain this, the present invention essentially comprises a new and improved fishing rod holder assembly comprising, in combination: a cart formed in a generally rectangular configuration with two side walls, a handle and two wheels; a fishing pole including a handle and a reel; a base board formed in a generally rectangular configuration with an upper surface, a lower surface, short upper and lower edges and two long side edges, the base board being fabricated of rigid transparent plastic, the base board having four corners each including an aperture extending therethrough, the center point of the lower surface of the base board having a recess positioned therein, a circular hole extending through the center point of the recess; four elastic cords each including a loop end and a free end, the loop end of each cord being coupled through one of the apertures in the base board, a hook being coupled to the free end of each cord to permit secure coupling of the base board to a side wall of the cart; and a fishing rod support tube fabricated of plastic and formed in an elongated cylindrical configuration with an open end, a closed end and an essentially hollow interior, elastomeric material being positioned within the tube adjacent the closed end, the tube including a centrally positioned radially extending hole, in an operative orientation a bolt being positioned through the hole in the tube and circular hole in the base board, a wing nut being coupled around the bolt and positioned within the recess, in an operative orientation a user coupling the base board to a side of the cart and adjusting the angle of the tube by first loosening and then tightening the wing nut, the user then positioning the handle of the fishing rod within the tube.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod holder assembly which has all the advantages of the prior art fishing accessory carriers and none of the disadvantages.

It is another object of the present invention to provide a new and improved fishing rod holder assembly which may be easily and efficiently manufactured and marketed.

It is a further object of the present invention to provide a new and improved fishing rod holder assembly which is of durable and reliable construction.

An even further object of the present invention is to provide a new and improved fishing rod holder assembly which is susceptible of a low cost of manufacture with regard to both materials and labor, and which accordingly is then susceptible of low prices of sale to the consuming public, thereby making such a fishing rod holder assembly economically available to the buying public.

Still yet another object of the present invention is to provide a new and improved fishing rod holder assembly which provides in the apparatuses and methods of the prior art some of the advantages thereof, while simultaneously overcoming some of the disadvantages normally associated therewith.

Even still another object of the present invention is to provide a new and improved fishing rod holder assembly for supporting a fishing rod in a desired position.

Lastly, it is an object of the present invention to provide a new and improved fishing rod holder assembly a fishing rod holder assembly adapted for use in association with a cart and a fishing rod, the apparatus comprising: a base board formed in a planar configuration with a centrally positioned hole extending therethrough, the base board including coupling devices extending therefrom; and a fishing rod support tube formed in an elongated cylindrical configuration with an open end, a closed end and an essentially hollow interior, the tube including a centrally positioned radially extending hole, in an operative orientation a bolt being positioned through the hole in the tube and circular hole in the base board, a wing nut being coupled around the bolt, in an operative orientation a user coupling the base board to a cart and adjusting the angle of the tube by first loosening and then tightening the wing nut, the user then positioning a fishing rod within the tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
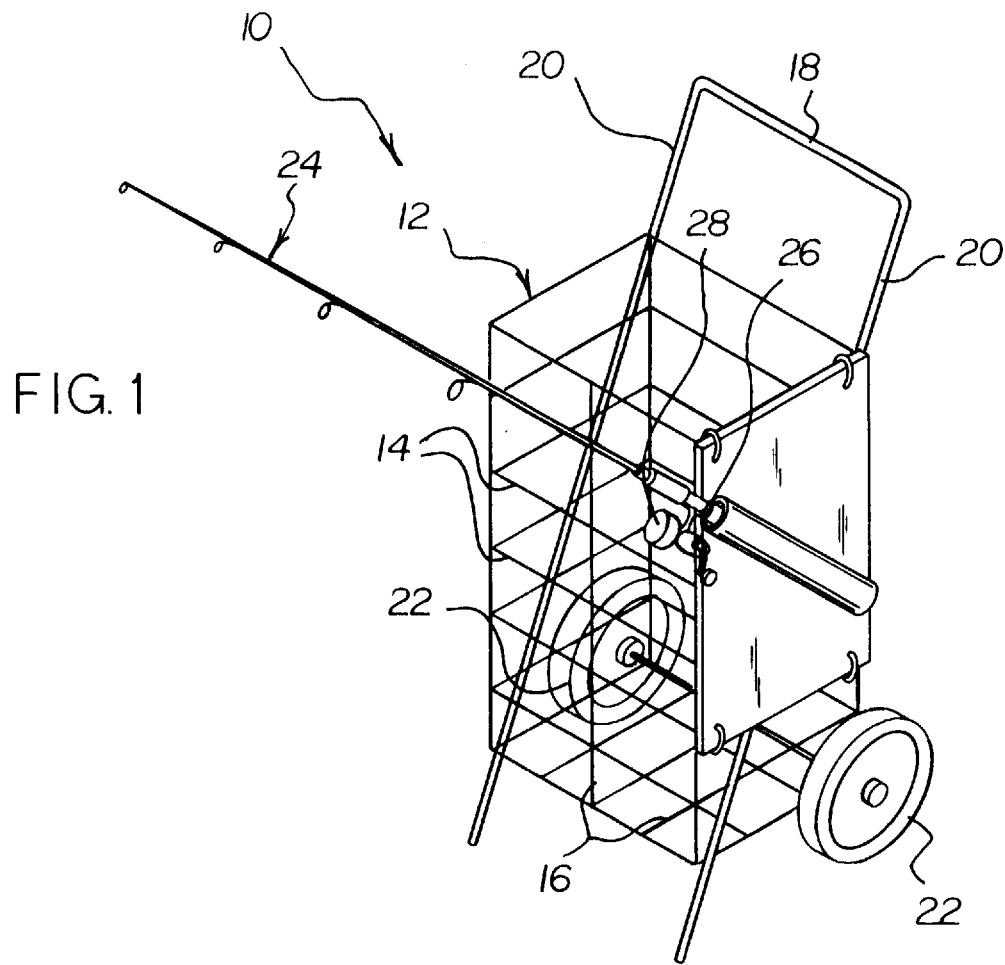
FIG. 1 is a perspective view of the preferred embodiment of the fishing rod holder assembly constructed in accordance with the principles of the present invention.

With reference now to the drawings, and in particular, to FIG. 1 thereof, the preferred embodiment of the new and improved fishing rod holder assembly embodying the principles and concepts of the present invention and generally designated by the reference number 10 will be described.

Specifically, it will be noted in the various Figures that the device relates to a fishing rod holder assembly. In its broadest context, the device consists of cart 12, a fishing rod 24, a base board 30 and a fishing rod support tube 44. Such components are individually configured and correlated with respect to each other so as to attain the desired objective.

The cart 12 is formed in a generally rectangular configuration with two side walls, a handle 18 and two wheels 22. In the preferred embodiment the side, front and rear walls of the cart are formed of a plurality of horizontal 14 and vertical 16 rods. The handle 18 includes two extension poles 20 which extend through the floor of the cart to permit the user to secure the cart in a fixed position when desired. Note FIG. 1.

The fishing pole 24 includes a handle 26 and a reel 28. In an operative orientation the base board of the assembly is coupled to a side wall of the cart and the tube is positioned at the desired angle. The handle of the fishing pole is then positioned within the tube such that the reel is positioned a short distance outside the open end of the tube. This configuration permits a user to access the reel when a fish is detected. Note FIG. 1.

Figure 4:
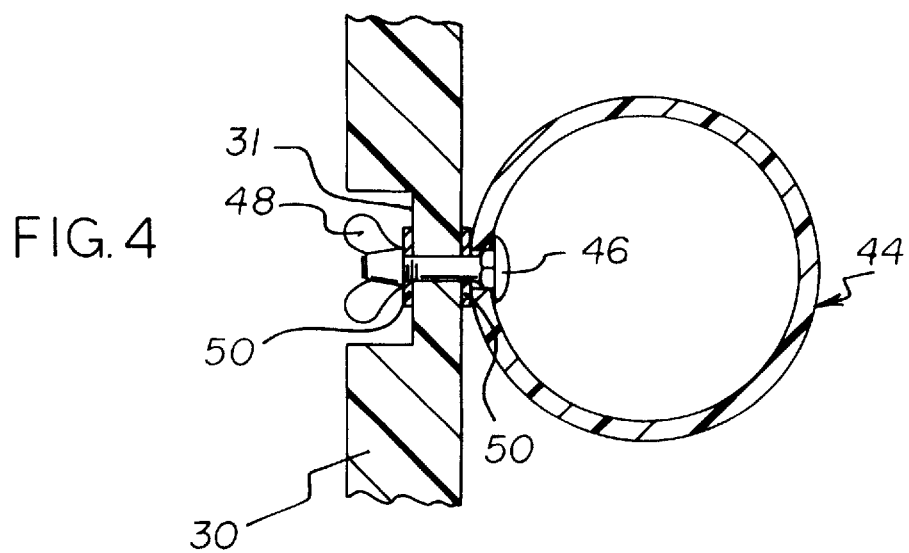
FIG. 4 is a cross sectional view of the base board and fishing rod support tube taken along section line 4—4 of FIG. 3.

The base board 30 is formed in a generally rectangular configuration with an upper surface, a lower surface, a short upper edge 32, a short lower edge 34 and two long side edges 36, 38. The base board is fabricated of rigid transparent plastic. In alternate embodiments of the apparatus the base board is fabricated of one of the following materials: light weight metal, wood, or ceramic. The base board has four corners each including an aperture. The center point of the lower surface of the base board has a recess 31 positioned within it. A circular hole extends through the center point of the recess. The recess is deep enough to provide the necessary clearance area for the wing nut 48. Note FIG. 4.

Figure 2:
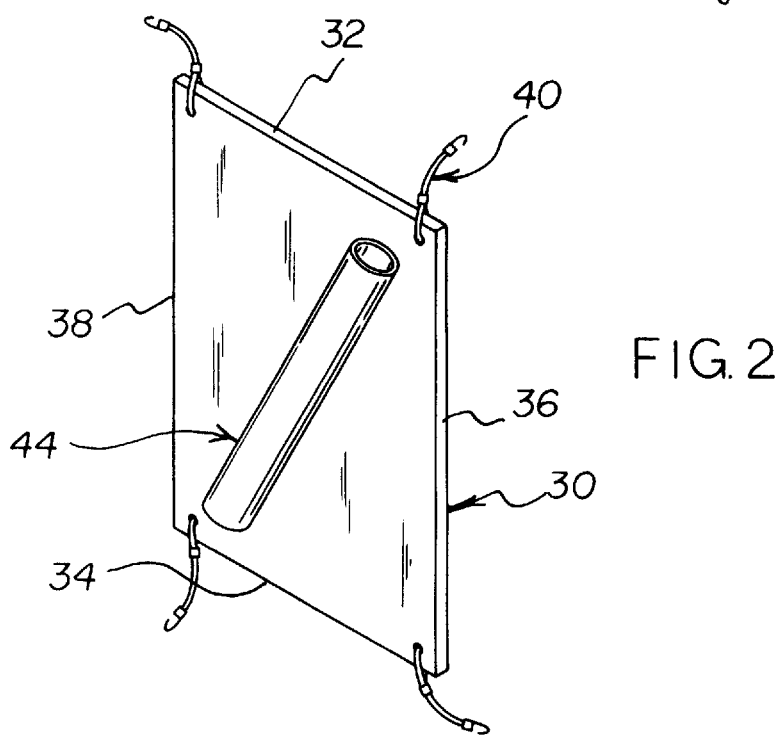
FIG. 2 is an isolated perspective view of the base board and fishing rod support tube of the apparatus.
Figure 6:
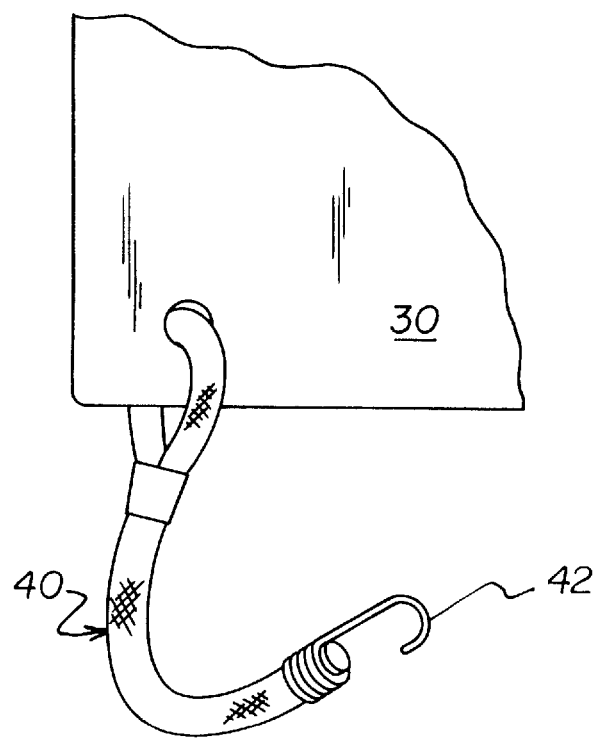
FIG. 6 is an isolated perspective view taken along section line 6 of FIG. 3 illustrating a support cord of the apparatus.

Four elastic cords 40 are included with the apparatus. Each elastic cord includes a loop end and a free end. The loop end of each cord is coupled through one of the apertures in the base board. A hook 42 is coupled to the free end of each cord to permit secure coupling of the base board to a side wall of the cart. This is accomplished by threading the cords through the vertical and horizontal bars of the cart and wedging the hooks around the bars. The elastic cords facilitate tight coupling around the bars. Note FIGS. 2, 4 and 6.

Figure 3:
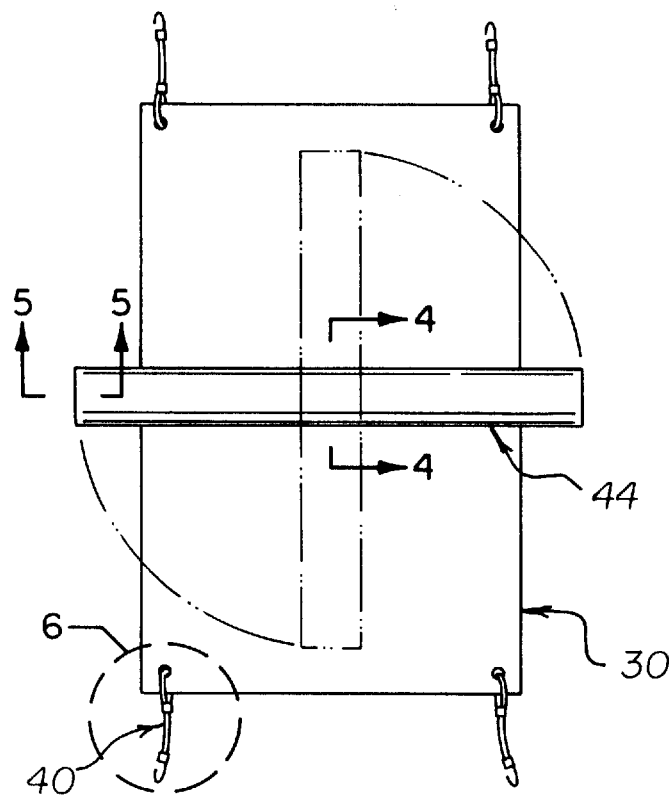
FIG. 3 is a top perspective view of the base board and fishing rod support tube of the apparatus.
Figure 5:
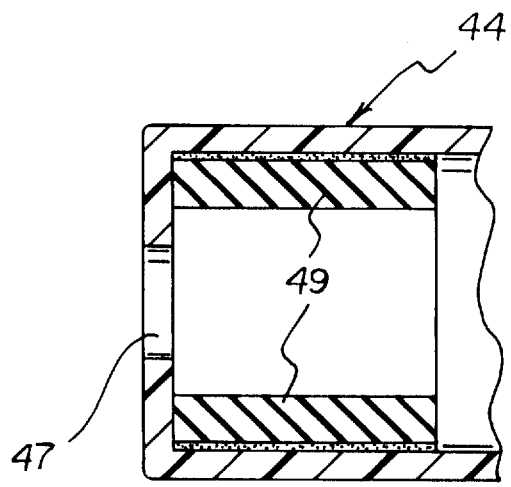
FIG. 5 is a cross sectional view of the fishing rod support tube taken along section line 5—5 of FIG. 4 illustrating the elastomeric material within the tube.

The fishing rod support tube 44 is fabricated of plastic and formed in an elongated cylindrical configuration with an open end, a closed end and an essentially hollow interior. Elastomeric material 49 is positioned within the tube adjacent the closed end. In the preferred embodiment the elastomeric material utilized is rubber. The closed end has a water drainage hole 47 positioned through it. The tube includes a centrally positioned radially extending hole. In an operative orientation a bolt 46 is positioned through the hole in the tube and circular hole in the base board. A wing nut 48 is coupled around the bolt and positioned within the recess. Washers 50 are positioned between the wing nut and washer, and the tube and base board to facilitate tightening. Note FIGS. 3 and 5.

In an operative orientation a user first couples the base board to a side of the cart and then adjusts the angle of the tube by first loosening and then tightening the wing nut. The tube can be rotated 360 degrees. The user then positions the handle of the fishing rod within the tube. The handle of the fishing pole becomes frictionally secured within the rubber in the tube. This prevents the rod from becoming dislodged when a fish tugs on the line. Note FIGS. 1, 3 and 5.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rotatable fishing rod holder assembly for a cart comprising, in combination:

a cart formed of a plurality of horizontal and vertical rods being in a generally rectangular configuration and forming a front wall and a rear wall with two side walls therebetween, a handle being extended through a floor of the cart and two wheels mounted to the floor of the cart;

a fishing pole including a handle and a reel;

a base board formed in a generally rectangular configuration with an upper surface, a lower surface, short upper and lower edges and two long side edges, the base board being fabricated of rigid transparent plastic, the base board having four corners each including an aperture extending therethrough, the center point of the loser surface of the base board having a recess positioned therein, a circular hole extending through the center point of the recess;

four elastic cords each including a loop end and a free end, the loop end of each cord being coupled through one of the apertures in the base board, a hook being coupled to the free end of each cord to permit secure coupling of the base board to a side wall of the cart; and a fishing rod support tube fabricated of plastic and formed in an elongated cylindrical configuration with an open end, a closed end and an essentially hollow interior, elastomeric material being positioned within the tube adjacent the closed end, the tube including a centrally positioned radially extending hole, in an operative orientation a bolt being positioned through the hole in the tube and circular hole in the base board, a wing nut being coupled around the bolt and positioned within the recess, wherein in an operative orientation a user coupling the base board to a side of the cart and adjusting the angle of the tube by first loosening and then tightening the wing nut, the user then positioning the handle of the fishing rod within the tube.

2. A rotatable fishing rod holder assembly for a cart comprising;

a base board formed in a planar configuration with a centrally positioned hole extending therethrough, the base board including coupling devices extending therefrom, the coupling devices of the base board are four elastic cords each including a loop end and a free end, the loop end of each cord being coupled through the base board, a hook being coupled to the free end of each cord to permit secure coupling of the base board to a side wall of a cart;

a fishing rod support tube formed in an elongated cylindrical configuration with an open end, a closed end and an essentially hollow interior, the tube including a centrally positioned radially extending hole, in an operative orientation a bolt being positioned through the hole in the tube and circular hole in the base board, a wing nut being coupled around the bolt, wherein in an operative orientation a user coupling the base board to the cart and adjusting the angle of the tube by first loosening and then tightening the wing nut, the user then positioning a fishing pole within the tube, the fishing pole having a handle and a reel.

\* \* \* \* \*